(12) United States Patent
Candage et al.

(10) Patent No.: US 10,461,641 B2
(45) Date of Patent: Oct. 29, 2019

(54) REFERENCE VOLTAGE CONTROL IN A POWER SUPPLY

(71) Applicant: Infineon Technologies Austria AG, Villach (AT)

(72) Inventors: Anthony B. Candage, Meredith, NH (US); Keng Chen, Sudbury, MA (US); Paul Sisson, Exeter, RI (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/909,382

(22) Filed: Mar. 1, 2018

(65) Prior Publication Data

US 2019/0273435 A1    Sep. 5, 2019

(51) Int. Cl.
*H02M 3/158*    (2006.01)
*H02M 1/08*    (2006.01)
*H02M 1/00*    (2006.01)

(52) U.S. Cl.
CPC ............. *H02M 3/158* (2013.01); *H02M 1/08* (2013.01); *H02M 2001/0025* (2013.01)

(58) Field of Classification Search
CPC . H02M 3/158; H02M 1/08; H02M 2001/0025
See application file for complete search history.

(56) References Cited

U.S. PATENT DOCUMENTS

| | | | |
|---|---|---|---|
| 4,160,981 A | 7/1979 | Raney, Jr. | |
| 5,600,234 A | 2/1997 | Hastings | |
| 6,066,943 A | 5/2000 | Hastings | |
| 6,930,526 B1 | 8/2005 | Silva | |
| 7,782,024 B2 | 8/2010 | Fukushi | |
| 8,018,210 B2* | 9/2011 | Chen | H02M 3/156 323/224 |
| RE43,414 E * | 5/2012 | Walters | H02M 3/156 323/282 |
| 8,183,848 B2* | 5/2012 | Kuo | H02M 3/1563 323/225 |
| 8,217,636 B2 | 7/2012 | Khayat | |
| 8,896,284 B2* | 11/2014 | Fan | H02M 3/1588 323/285 |
| 9,270,176 B1 | 2/2016 | Nguyen et al. | |

(Continued)

OTHER PUBLICATIONS

Kuang-Yao Cheng, et al., "Characterization and Performance Comparison of Digital V2-Type Constant on-Time Control for Buck Converters", Jun. 1, 2010, pp. 1-6, Control an Modeling for Power Electronics (Compel), 2010 IEEE 12th Workshop on.

(Continued)

*Primary Examiner* — Emily P Pham
(74) *Attorney, Agent, or Firm* — Armis IP Law, LLC

(57) ABSTRACT

A power supply includes a power converter, a reference voltage generator, and a controller. During operation, the power converter produces an output voltage to power a load. The reference voltage generator (such as a voltage mode amplifier circuit) generates a floor reference voltage, a magnitude of which varies as a function of the output voltage. The controller compares an output voltage feedback signal (derived from the output voltage) to the floor reference voltage to produce control output to control timing of activating switches in the power converter to maintain the output voltage within a desired voltage range.

18 Claims, 10 Drawing Sheets

(56) References Cited

U.S. PATENT DOCUMENTS

| | | | |
|---|---|---|---|
| 9,606,564 B2* | 3/2017 | Agrawal | G05F 3/08 |
| 2008/0049478 A1 | 2/2008 | Wong | |
| 2009/0206808 A1* | 8/2009 | Wrathall | H02M 3/1588 |
| | | | 323/282 |
| 2009/0243580 A1 | 10/2009 | Chen | |
| 2011/0316508 A1 | 12/2011 | Cheng et al. | |
| 2012/0313603 A1 | 12/2012 | Ochoa | |
| 2012/0326688 A1 | 12/2012 | Sun et al. | |
| 2013/0038301 A1 | 2/2013 | Ouyang et al. | |
| 2013/0038302 A1 | 2/2013 | Qian et al. | |
| 2013/0128627 A1 | 5/2013 | Moon | |
| 2013/0141069 A1 | 6/2013 | Li | |
| 2013/0187624 A1 | 7/2013 | Wakasugi | |
| 2014/0091774 A1 | 4/2014 | Srinivasan et al. | |
| 2014/0176091 A1* | 6/2014 | Chiang | H02M 3/158 |
| | | | 323/234 |
| 2014/0327423 A1 | 11/2014 | Lee et al. | |
| 2014/0361687 A1 | 12/2014 | Olson | |
| 2015/0311798 A1 | 10/2015 | Yuan et al. | |
| 2016/0006352 A1 | 1/2016 | Hang et al. | |
| 2016/0067963 A1 | 3/2016 | Van Brocklin et al. | |
| 2017/0155315 A1* | 6/2017 | Yasusaka | G05F 1/468 |

OTHER PUBLICATIONS

Tian Shulin, et al., "Small-signal Mode Analysis and Design of Constant-on-time V2 Control for Low-ESR Caps with External Ramp Compensation" Sep. 17, 2011, pp. 2944-2951, Energy Conversion Congress and Exposition (ECCE), IEEE.

Tian Shuilin, et al., "A Three-Terminal Switch Model of Constant On-Time Current Mode with External Ramp Compensation", Oct. 1, 2016, pp. 7311-7319, IEEE Transactions on Power Electronics, vol. 31, No. 10.

Extended European Search Report, EP 18176183.4, dated Oct. 10, 2018, pp. 12.

* cited by examiner

REFERENCE VOLTAGE CONTROL IN A POWER SUPPLY

RELATED APPLICATION

This application is related to U.S. patent application Ser. No. 15/909,323 entitled "REFERENCE VOLTAGE CONTROL IN A POWER SUPPLY,", filed on Mar. 1, 2018, the entire teachings of which are incorporated herein by this reference.

BACKGROUND

Conventional power supplies may include one or more DC to DC converters to produce a respective output voltage to power a load.

One type of DC-to-DC converter is a single-stage power converter system. As its name suggests, in the single-stage power converter system, each phase includes a single power converter to convert an input voltage such as 12 V DC (Volts Direct Current) into a respective target output voltage such as 1 volt DC to power a load.

One type of power converter is a buck converter. A so-called Constant ON Time (COT) switching buck regulator has fixed ON-time and uses off-time Pulse Width Modulation (PWM) to regulate an output voltage. In general, to maintain an output voltage within a desired range, the buck converter compares the magnitude of a generated output voltage to control respective switch circuitry (such as a control switch and synchronous switch).

BRIEF DESCRIPTION

Embodiments herein include novel ways of providing accurate voltage regulation in a switching power supply.

More specifically, embodiments herein include a novel power supply configuration including a reference voltage generator, controller, and power converter. During operation, the power converter produces an output voltage to power a load. The reference voltage generator generates a floor reference voltage. A magnitude of the floor reference voltage is adapted to vary as a function of the output voltage. The controller receives and compares an output voltage feedback signal (derived from the output voltage) to the floor reference voltage to produce control output to control the power converter and generation of the output voltage.

In one embodiment, the reference voltage generator includes an integrator amplifier (circuit) to generate the floor reference voltage based on a magnitude of the output voltage and a fixed reference voltage. In such an instance, the reference voltage generator receives a fixed reference voltage signal on a non-inverting input of the integrator amplifier. The reference voltage generator receives an output voltage feedback signal on a circuit path or component(s) coupled to an inverting input of the integrator amplifier. The integrator amplifier varies a magnitude of the floor reference voltage based on variations in the magnitude of the output voltage (and corresponding output voltage feedback signal).

In accordance with further embodiments, the reference voltage generator (such as an integrator amplifier, as previously discussed) is configured to include a combination pole and zero set by components disposed in a feedback path between an output node of the integrator amplifier and an inverting input of the integrator amplifier.

The reference voltage generator can be configured to include a first gain path and a second gain path, the first gain path providing DC (Direct Current) gain, the second gain path providing AC (Alternating Current) gain. In one embodiment, the magnitude of the DC gain provided by the first gain path is substantially higher (greater) than a magnitude of the AC gain provided by the second gain path.

In accordance with yet further embodiments, the reference voltage generator includes or is PI (Proportional-Integrator) controller circuitry and supplemental DC gain path.

In accordance with still further embodiments, the controller of the power supply as discussed herein can be configured to include a comparator operable to compare the output voltage feedback signal to the floor reference voltage (such as a threshold value) to produce the control output. In one embodiment, the power converter operates in a so-called constant ON time mode in which the power converter utilizes the output control produced by the controller to generate fixed pulse width switch control signals to produce the output voltage based on a comparison of the output voltage feedback signal and the floor reference voltage.

Note further that although embodiments as discussed herein are applicable to multi-phase power supply circuits such as those implementing buck converters, DC-DC converter phases, the concepts disclosed herein may be advantageously applied to any other suitable topologies as well as general power supply control applications.

Embodiments herein are useful over conventional techniques. For example, the reference voltage generator (including a voltage mode amplifier) as discussed herein provides functionality in a small circuit footprint and provides better regulation of a generated output voltage over different possible operating conditions.

These and other more specific embodiments are disclosed in more detail below.

Note that techniques as discussed herein can be implemented in any suitable environment such as multi-phase power supply applications, single phase point of load (a.k.a., POL) power supply applications, etc.

Note further that although embodiments as discussed herein are applicable to multi-phase power supply circuits such as those implementing buck converters, DC-DC converter phases, the concepts disclosed herein may be advantageously applied to any other suitable topologies as well as general power supply control applications.

Additionally, note that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program instructions and/or logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), circuit logic, etc. The software or firmware or other such configurations can be installed onto a respective controller circuit to cause the controller circuit (such as logic) to perform the techniques explained herein.

Accordingly, one embodiment of the present disclosure is directed to a computer program product that includes a computer readable medium having instructions stored thereon for supporting operations such as controlling one or more phases in a power supply. For example, in one embodiment, the instructions, when carried out by computer processor hardware (one or more computer devices, control logic, digital circuitry, etc.), cause the computer processor hardware to: produce an output voltage to power a load; generate a floor reference voltage, a magnitude of the floor reference voltage varying as a function of the output voltage; and produce control output as a function of the floor reference voltage and the output voltage to control a power converter producing the output voltage.

The ordering of the operations has been added for clarity sake. The operations can be performed in any suitable order.

It is to be understood that the system, method, device, apparatus, logic, etc., as discussed herein can be embodied strictly as hardware (such as analog circuitry, digital circuitry, logic, etc.), as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
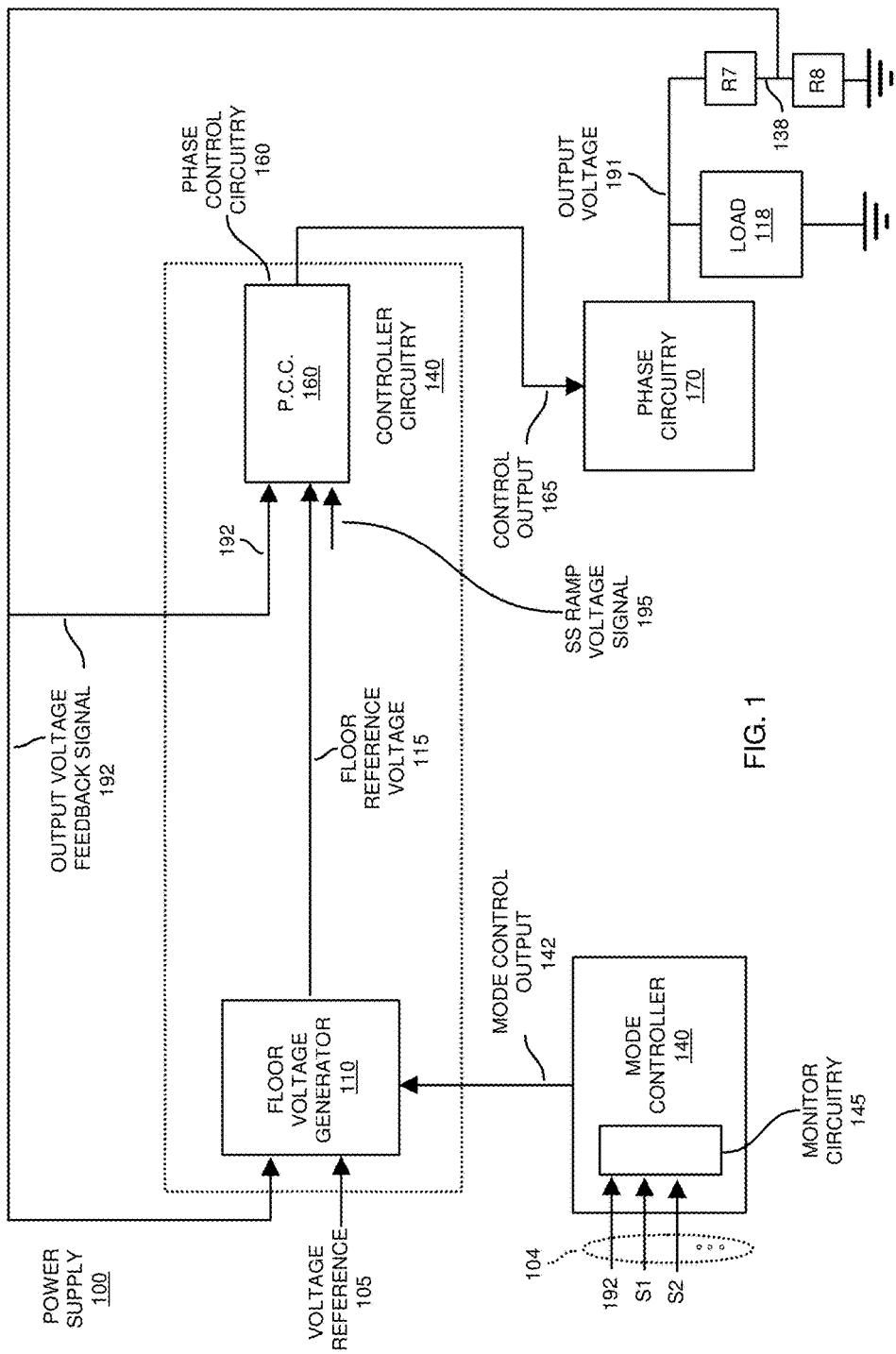
FIG. 1 is an example diagram illustrating a power supply including a floor reference voltage generator and corresponding mode controller according to embodiments herein.

Now, more specifically, FIG. 1 is an example diagram of a power supply according to embodiments herein.

As shown, embodiments herein include a floor reference voltage generator 110, an optional mode controller 140, phase control circuitry 160, and phase circuitry 170. The floor reference voltage generator 110, and the mode controller 140 of power supply 100 typically take the form of circuitry. However, the instantiation of same may vary depending on the embodiment. The terms floor reference voltage generator circuit(ry) and mode control circuit(ry) may be used as non-limiting equivalents here below.

In general, during operation, the floor reference voltage generator 110 outputs a floor reference voltage 115. In addition, the floor reference voltage generator 110 receives an output voltage feedback signal 192 as well as a reference voltage 105 (such as a fixed DC voltage setpoint). The output voltage feedback signal 192 is derived from an output voltage 191 of the power supply produced by the phase circuitry 170 and which powers a load 118.

In one embodiment, the output voltage feedback signal 192 is a ratio metric value derived from the output voltage 191. For instance, this metric is defined by [R7/(R7+R8)]*output voltage 191. R7 and R8 are resistor values that can be any suitable values depending on the embodiment.

In one embodiment, the output voltage feedback signal 192 is set to the output voltage 191.

The difference in magnitude between the output voltage feedback signal 192 and the reference voltage 105 indicates a degree to which the respective output voltage 191 of the power supply 100 is in or out of regulation.

The mode controller 140 switches between operating the floor voltage generator circuit 110 in a static voltage mode (fixed floor voltage mode) and a dynamic mode (varying floor voltage mode).

Advantageously, the mode controller 140 carries out the switches based on the monitoring by monitor circuitry 145 of the mode controller 140 of one or more conditions (such as operational attributes) of the power supply 100. For instance, these conditions are monitored through one or more input 104 (such as an output voltage feedback signal 192, status information S1, S2, etc.).

In one embodiment, the monitor circuitry 145 monitors the magnitude of the output voltage 191 (via monitoring output voltage feedback signal 192). In addition or alternatively, the monitor circuitry 145 monitors an amount of current provided by output voltage 191 consumed by the load 118, monitor current through a respective one or more inductors, etc. These operating conditions are further discussed below.

Based on monitoring inputs 104, the mode controller 140 produces mode control output 142 (one or more signals) to control operation of floor voltage generator 110.

More specifically, in the static mode, the mode controller 140 outputs the mode control output 142 to control the floor generator circuit 110 to set the floor reference voltage 115 to a predetermined fixed voltage value. In the variable (dynamic) mode, the mode controller 140 produces the mode control output 142 to operate the floor voltage generator circuit 110 in variable mode in which the floor reference voltage 150 produced by the floor voltage generator circuit 110 varies over time.

In other words, the floor reference voltage 115 is adapted to vary in at least one operation mode of the power supply. In addition, the floor reference voltage 115 is adapted to be set to a predetermined fixed value in at least one operation mode of the power supply. In one embodiment, e.g. one without the mode controller 140, the floor reference voltage 115 is configured to vary as a function of the output voltage.

The phase control circuitry 160 is configured to output a control output 165 based on which the phase circuitry 170 outputs the output voltage 191. The control output 165 is determined as a function of the output voltage, for instance through the output voltage feedback signal 192, and as a function of the floor reference voltage 115. By "as a function of the floor reference voltage", it is understood that the floor reference 115 may be used directly as a value used to determine the control output 165, e.g. through a comparison of the floor reference 115 to one or more signal such as the output voltage feedback signal 192, or indirectly, e.g. as used in the definition of a value itself used directly for the determination of the control output 165, e.g. through a comparison of the value to one or more signal.

For instance, as discussed in more details below, the output voltage feedback signal 192 and the floor reference voltage 115 are compared to one another directly to generate the control output 165, optionally also with a soft-startup voltage signal 195 during a soft-startup of the device. Advantageously, this configuration is implemented when the output voltage feedback signal 192 includes a ripple voltage component.

In an embodiment, a ramp voltage is used and is offset relative to the output voltage feedback signal 192 to form an offset ramp voltage signal, which is then compared to the floor reference voltage 115 to produce the control output 165.

In an embodiment, a ramp voltage is used and is offset relative to the floor reference voltage 115 to form an offset ramp voltage signal, which is then compared to the output voltage feedback signal 192 to produce the control output 165.

As further discussed below, the control output 165 (such as one or more control signals) is used as a basis to control phase circuitry 170 (such as a one or more switching phases of power supply 100). In other words, based on control output 165 (such as pulse width modulation control information), the phase circuitry 170 produces the output voltage 191 to power the respective load 118.

The power supply 100 also includes a circuit configured to output the output voltage feedback signal 192, which is used as a basis to generate the floor reference voltage 115 and the control output 165. As previously discussed, this circuit may take the form of a voltage divider circuit including resistor R7 and resistor R8. For instance, the center tap node 138 of the voltage divider circuit outputs the output voltage feedback 192.

Figure 2:
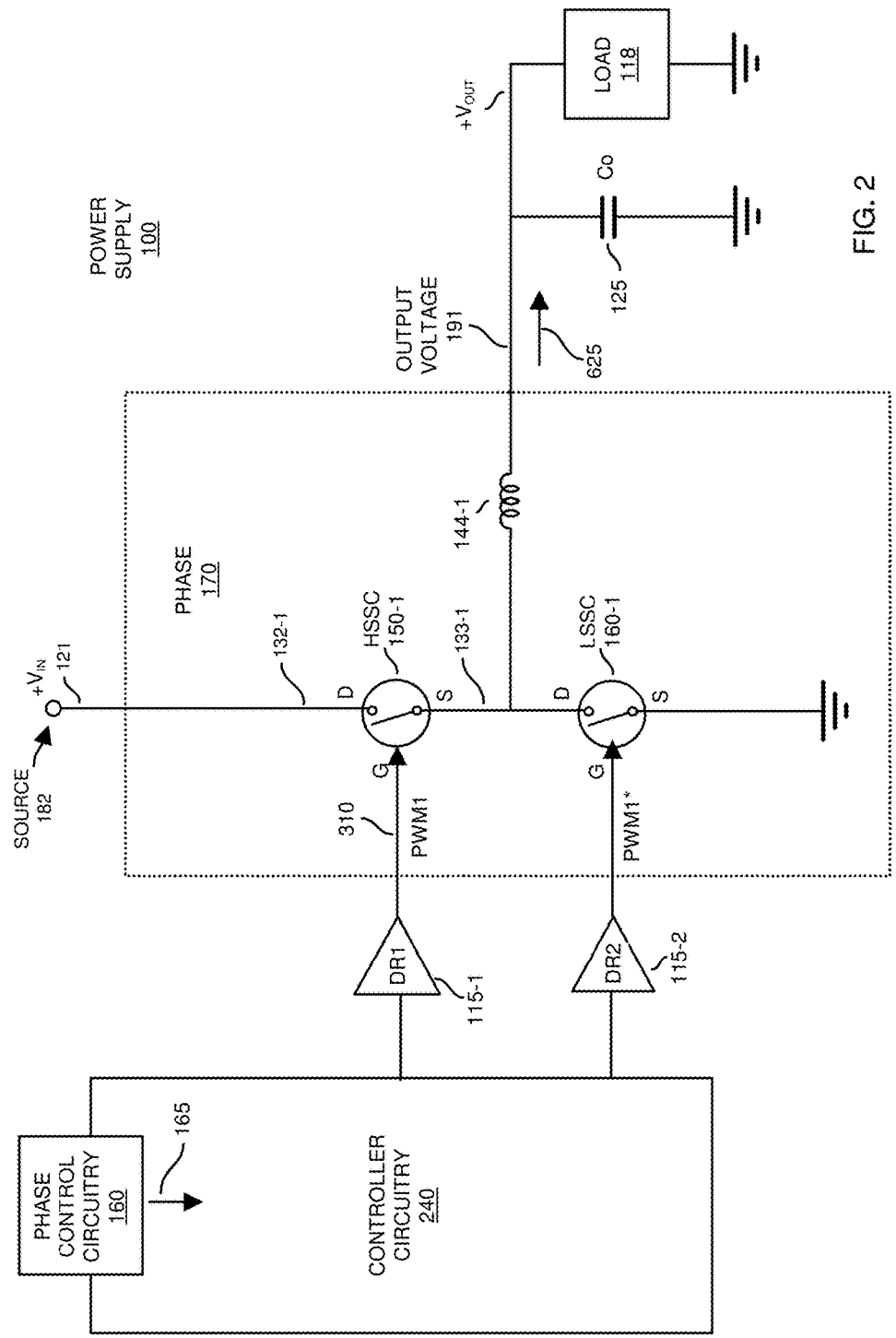
FIG. 2 is an example diagram illustrating a power converter circuit (such as including one phase) of a power supply according to embodiments herein.

The following FIG. 2 illustrates an example of phase circuitry 170 to produce the output voltage 191 based on control output 165 in a buck configuration for a given phase of the power supply.

As shown in FIG. 2, the phase circuitry 170 to generate output voltage 191 includes driver circuitry 115-1, driver circuitry 115-2, high side switch circuitry 150-1 (such as a control switch or switches), low side switch circuitry 160-1 (such as a synchronous switch or switches), controller circuitry 240 and inductor 144-1. Control output 165 serves as a basis to control high side switch circuitry 150-1 and low side switch circuitry 160-1.

Note that switch circuitry 150-1, 160-1 can be any suitable type of switch resource (field effect transistors, bipolar junction transistors, etc.). In one embodiment, each of the high side switch circuitry 150-1 and low side switch circuitry 160-1 are power MOSFET (Metal Oxide Semiconductor Field Effect Transistor) or other suitable switch devices.

Appropriate switching of the high side switch circuitry 150-1 and the low side switch circuitry 160-1 results in generation of the output voltage 191 as is known in a conventional DC-DC converter such as a buck converter.

Typically, the controller circuitry 240 receives control output 165 from phase control circuitry 160 and, on this basis, controls the driver circuitry 115-1 to produce a PWM control signal 310 (PWM1) to control high side switch circuitry 150-1 and a PWM control signal (PWM1*) to control low-side switch circuitry 160-1. In general, the low side switch circuitry 160-1 is activated (closed or ON) when the high side switch circuitry 150-1 is deactivated (open or OFF), and vice versa.

Additional details of controlling the high side switch circuitry 150-1 and the low side switch circuitry 160-1 are further discussed below.

As further discussed herein, the phase control circuitry 160 (of FIG. 1) can be configured to compare the floor reference voltage 115 and the output voltage feedback signal 192 in a manner as previously discussed to determine timing of activating high side switch circuitry 150-1 of the respective phase in the phase circuitry 170 to an ON (closed switch) state. For example, the floor reference voltage 115 serves as a threshold value.

In one embodiment, when the magnitude of the output voltage feedback signal 192 crosses or falls below a magnitude of the floor reference voltage 115 (or when the magnitude of the an output voltage feedback signal 192 is substantially equal to the magnitude of the soft start signal), the phase control circuitry 160 produces the control output 165 to turn ON the high slide switch circuitry 150-1 (at which time the low side switch circuit 160-1 is turned OFF).

Note further that the power supply 100 and corresponding phase 170-1 can be operated in a so-called constant ON-time control mode in which the PWM (Pulse Width Modulation) setting of the ON-time of control pulses of switch circuitry (such as high side switch circuitry 150-1) in a phase is constant or fixed; the OFF time of high side switch circuitry 150-1 varies depending upon a subsequent cycle of comparing the floor reference voltage 115 to the output voltage feedback signal 192 and issuance of pulsing the high side switch circuitry 150-1 ON again via subsequent generate fixed pulse width switch control signals. If the decay of the magnitude of the output voltage 191 is slow, the frequency of pulsing the high side switch circuitry 150-1 ON again decreases.

Thus, in the constant ON-time control mode in which the ON-time of activating the high side switch circuitry is a fixed or predetermined value, the frequency of activating the high side switch varies to maintain the output voltage 191 to a desired set point.

Figure 3:
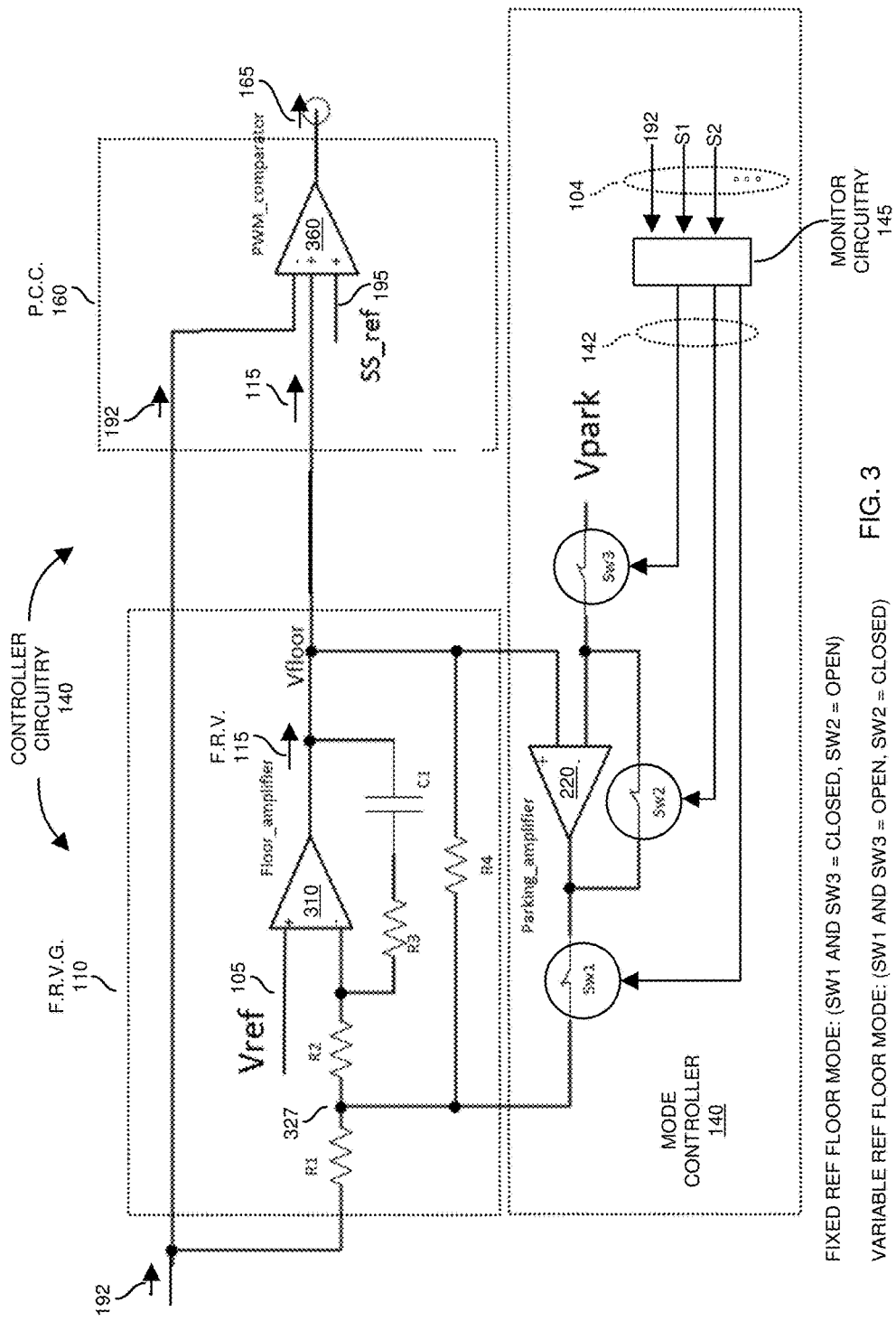
FIG. 3 is an example diagram illustrating a power supply and related circuitry according to embodiments herein.

FIG. 3 is an example diagram illustrating the details of the floor reference voltage generator, mode controller, and of the phase control circuitry according to embodiments herein.

In the non-limiting example embodiment of FIG. 3, the floor reference voltage generator 110 includes amplifier 310 and a configuration of resistors R1, R2, R3, R4, as well as capacitor C1 in a feedback path between the output of amplifier 310 and the non-inverting input of the amplifier 310.

As previously discussed, the floor reference voltage generator 110 produces floor reference voltage 115 having a magnitude, which depends on a mode selected by mode controller 140.

The mode controller 140 includes amplifier 220, switches SW1, SW2, and SW3, as well as monitor circuitry 145. The mode controller 140 controls an operational mode setting of the floor reference voltage generator 110 based on settings of switches SW1, SW2, and SW3.

As previously discussed, the monitor circuit 145 monitors one or more power supply conditions to determine in which state (fixed or variable mode) to operate the floor reference voltage generator 110.

During operation, a reference voltage Vpark (such as a predetermined fixed DC voltage value) is selectively coupled to the inverting input of the amplifier 220 via switch SW3. As further shown, the non-inverting input of the amplifier 220 is connected to receive the floor reference voltage 115.

In one embodiment, to operate the floor reference voltage generator 110 in the fixed voltage floor mode, the mode controller 140 sets each of the switches SW1 and SW3 to an ON state (closed, providing very low resistive path) and switch SW2 to an OFF state (open, providing a high resistive path). In such an instance, the mode control output 142 (such as a floor voltage override signal) outputted from the amplifier 220 to node 327 overrides the output voltage feedback signal 192 such that the floor reference voltage generator 110 produces the floor reference voltage 115 to be a predetermined fixed DC voltage value, such as Vpark. For instance, Vpark has a value of 550 mV DC (milliVolts) or other suitable setpoint value.

In accordance with further embodiments, to operate the floor reference voltage generator 110 in the variable voltage floor mode, the mode controller 140 sets each of the switches SW1 and SW3 to an OFF state (opened, providing very high resistive path) and switch SW2 to an ON state (closed, providing a low resistive path). In such an instance, the amplifier 220 no longer drives a feedback path (specifically node 327) of the floor reference voltage generator 110.

Instead, the amplifier 220 is set to operate in a unity gain mode in which the output of the amplifier 220 follows (tracks) the floor reference voltage 115 inputted to the non-inverting input of amplifier 220. As previously discussed, in the unity gain mode, closed switch SW2 connects the output of the amplifier 220 to the inverting input of the amplifier 220. Open switch SW1 ensures that the output of the amplifier 220 does not drive node 327 between resistor R1 and resistor R2. Thus, in the variable floor mode, the amplifier 220 can be configured as a tracking circuit operable to track the floor reference voltage 115.

Additionally, in the variable floor voltage mode, the output of the amplifier 220 is disconnected from driving the feedback path (such as node 327 or resistor R4) of floor reference voltage generator 110. In such an instance, the amplifier 310 produces the floor reference voltage 115 based upon a magnitude of reference voltage 105 and variations in the magnitude of the output voltage feedback signal 192.

Note further that, when the mode controller 140 switches back to operating the floor voltage generator circuit 110 from the variable voltage floor mode to the fixed voltage floor mode, the amplifier 310 produces the mode control output 142 to at least initially drive the node 327 between resistor R1 and resistor R2 with the previously tracked voltage value of the amplifier 220 in the unity gain mode. As previously discussed, in the static voltage floor mode, the amplifier 220 causes the floor reference voltage generator 110 to drive the floor reference voltage 115 to voltage, Vpark (such as 550 mVDC).

Conditions in which the mode controller 140 switches between modes is further discussed below.

In accordance with further embodiments, regardless of the selected floor voltage generator mode, comparator 360 compares the received output voltage feedback signal 192 to the smaller magnitude of the floor reference voltage 115 and the soft start reference 195 to produce output control 165.

Figure 4:
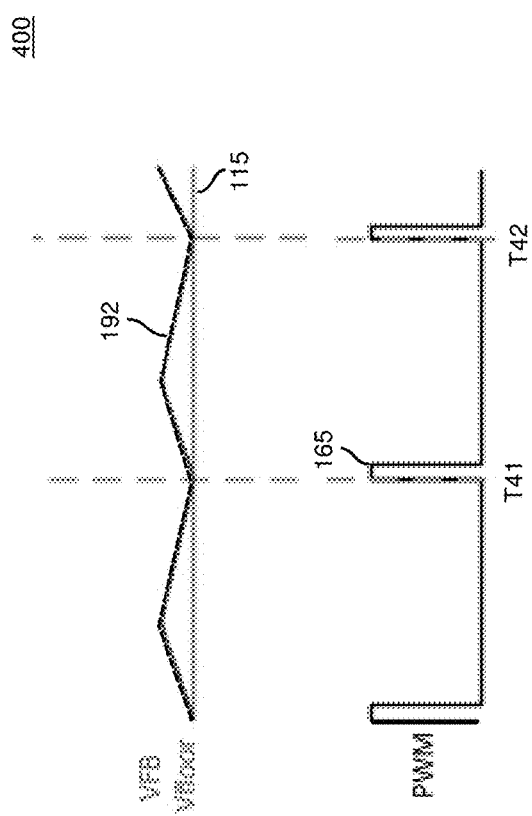
FIG. 4 is an example diagram illustrating a timing diagram according to embodiments herein.

FIG. 4 is an example diagram illustrating a timing diagram according to embodiments herein.

As previously discussed, the floor reference voltage 115 may be a static or varying voltage depending on the mode selected by mode controller 140.

During operation, as shown at time T41, the comparator 360 detects that the magnitude of the output voltage feedback signal 192 is substantially equal to the magnitude of the floor reference voltage 115. In response to detecting such a condition, the comparator 360 produces output control 165 to activate high side switch circuitry 150-1 in the power supply 100. The switching of the high side switch circuitry 150-1 for a predetermined ON-time causes the magnitude of the output voltage to increase again.

Eventually, after completion of the pulse, consumption of current by the load 118 causes the magnitude of the output voltage feedback signal 100 times to decrease again. At or around time T42, the comparator 360 detects that the magnitude of the output voltage feedback signal 192 is substantially equal to the magnitude of the floor reference voltage 115 again. In response to detecting such a condition, the switching of the high side switch circuitry 150-1 for a predetermined ON-time causes the magnitude of the output voltage to increase again. The switching of the high side switch circuitry 150-1 for predetermined ON-time causes the magnitude of the output voltage to increase again.

The cycles above are repeated to maintain the magnitude of the output voltage 191 in a desired range.

Figure 5:
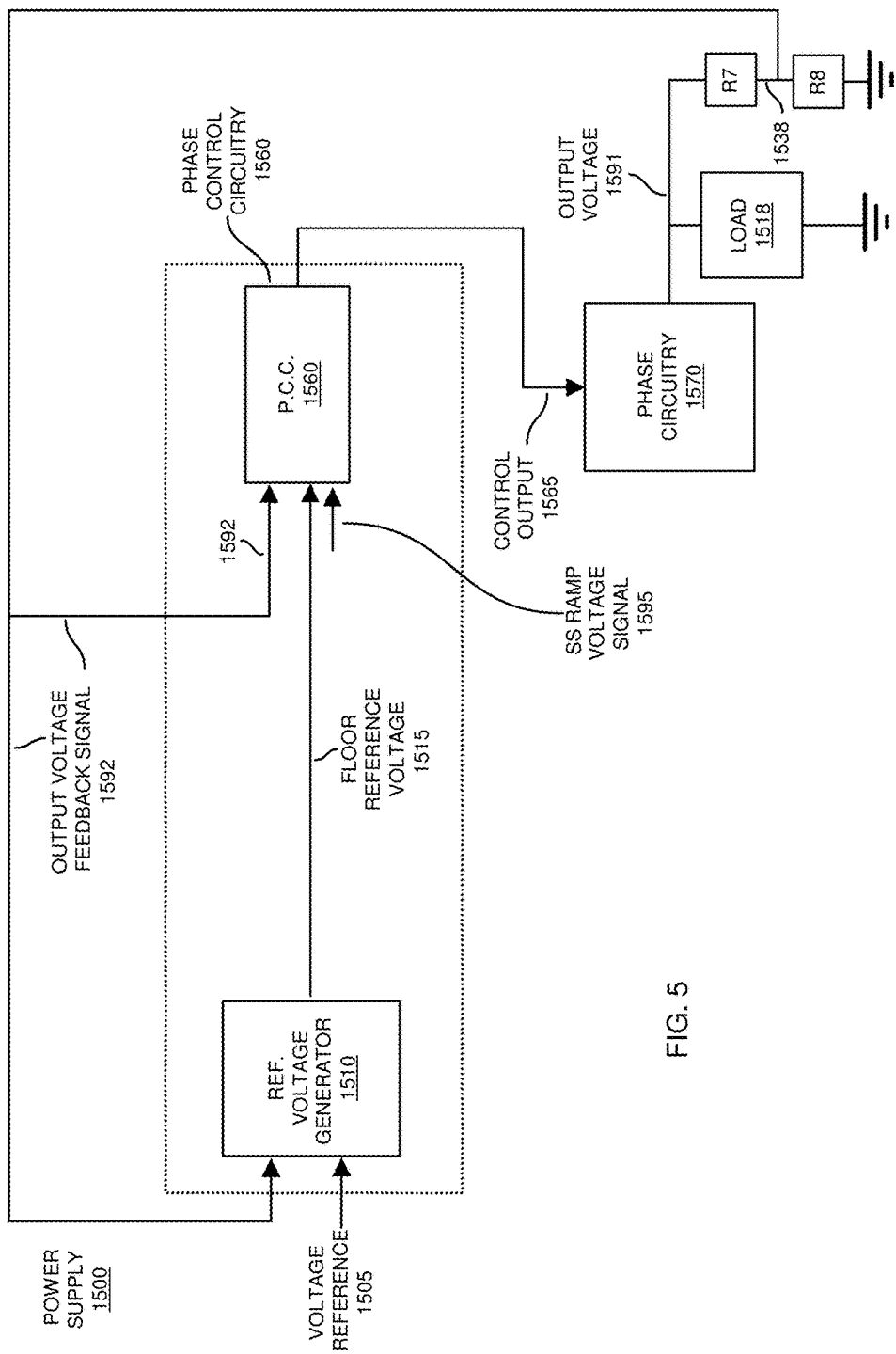
FIG. 5 is an example diagram illustrating a power supply including a floor voltage generator according to embodiments herein.

FIG. 5 is an example diagram illustrating a power supply including a reference voltage generator according to embodiments herein.

As shown, power supply 1500 includes resources such as reference voltage generator 1510, phase control circuitry 1560 (e.g., a controller), and phase circuitry 1570 (e.g., a power converter).

The reference voltage generator 1510, phase control circuitry 1560, phase circuitry (power converter) 1570, etc., of power supply 1500 typically take the form of analog and/or digital circuitry/hardware. The form of such resources may vary depending on the embodiment.

In general, during operation, the power converter 1570 (one or more power supply phases) produces an output voltage 1591 (such as a predetermined DC voltage) to power a load 1518.

Resistor divider R7 and R8 produce output voltage feedback signal 1592, which is a ratio metric value derived from the output voltage 1591. For instance, the magnitude of the output voltage feedback signal 1592 produced at node 1538 equals [R7/(R7+R8)] *a magnitude of the output voltage 1591.

Note that R7 and R8 are resistor values that can be any suitable values depending on the embodiment. If desired, the output voltage feedback signal 1592 can be set equal to the output voltage 1591. Accordingly, the output voltage feedback signal 1592 is derived from the output voltage 1591.

In addition to receiving the output voltage feedback signal 1592 (which tracks the output voltage 1591), the reference voltage generator 1510 receives reference voltage 1505 (such as a fixed DC voltage setpoint).

As its name suggests, and as further shown, the reference voltage generator 1510 generates a floor reference voltage 1515. In one embodiment, a magnitude of the floor reference voltage 1515 varies as a function of the output voltage 1591.

If desired, in a manner as previously discussed, the reference voltage generator 1510 can be controlled to produce the floor reference voltage 1515 as a static (fixed) predetermined DC voltage value instead of being a reference signal whose magnitude varies based on the output voltage feedback signal 1592.

Assume that the reference voltage generator 1510 operates in a variable floor voltage generator mode as shown in FIG. 5. In such an instance, as previously discussed, a magnitude of the floor reference voltage 1515 varies depending on a magnitude of the output voltage feedback signal 1592.

In one embodiment, the difference in magnitude between the output voltage feedback signal 1592 and the reference voltage 1505 indicates a degree to which the respective output voltage 1591 of the power supply 1500 is in or out of regulation.

As further shown, the phase control circuitry 1560 (controller) receives and compares the output voltage feedback signal 1592 (derived from the output voltage 1591) to the floor reference voltage 1515 to produce control output 1565 to control the phase circuitry 1570 and generation of the output voltage 1591 within a desired range.

Figure 6:
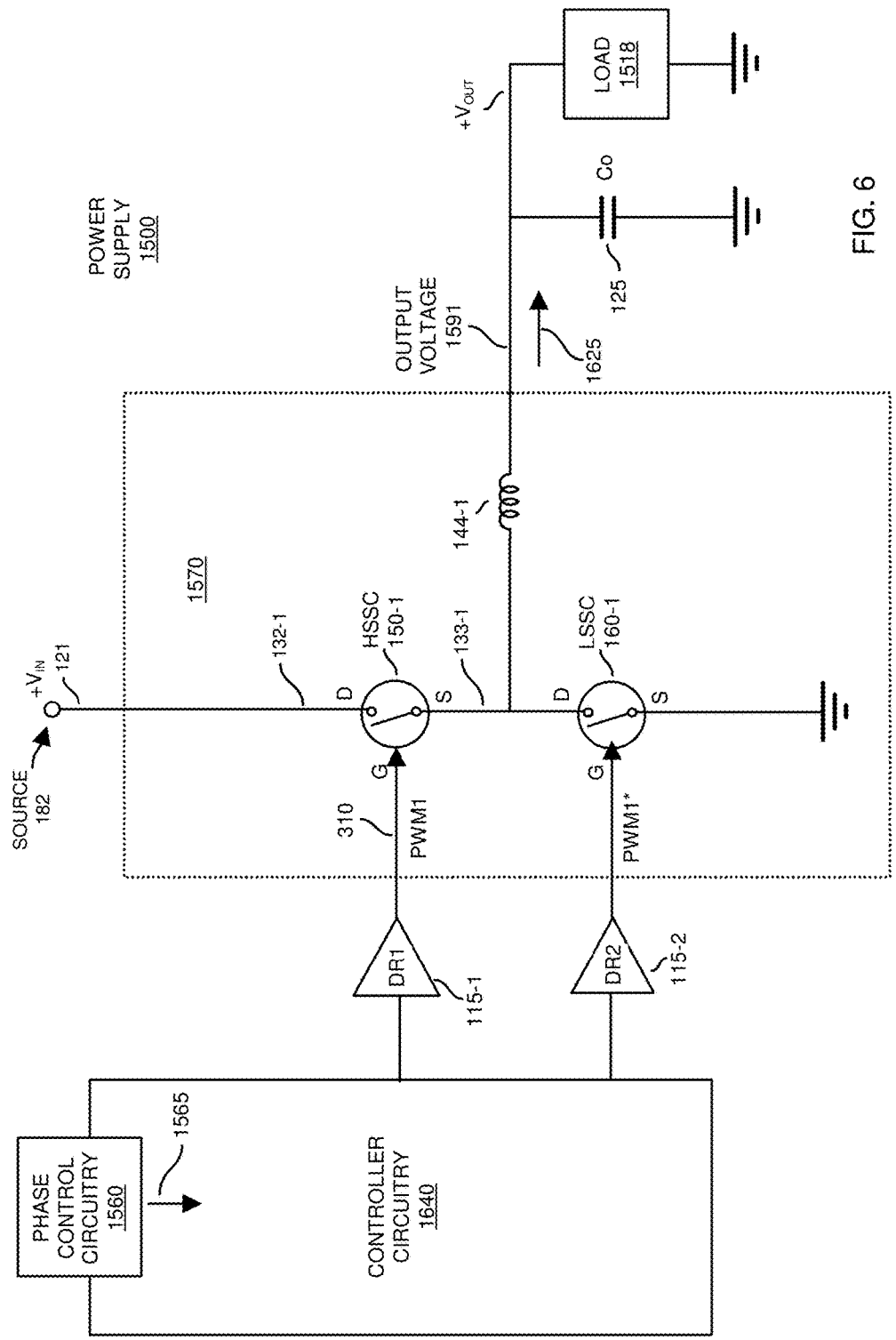
FIG. 6 is an example diagram illustrating a power converter circuit (such as including one phase) of a power supply according to embodiments herein.

FIG. 6 is an example diagram illustrating a power converter (buck configuration) and generation of an output voltage according to embodiments herein.

As shown, the phase circuitry 1570 (power converter such as a DC to DC voltage converter of power supply phase) includes driver circuitry 115-1 (DR1), driver circuitry 115-2 (DR2), high side switch circuitry 150-1 (such as a control switch or switches), low side switch circuitry 160-1 (such as a synchronous switch or switches), controller circuitry 1640 and inductor 144-1.

Control output 1565 serves as a basis to control high side switch circuitry 150-1 and low side switch circuitry 160-1 of the power converter 1670 (such as a power supply phase) to produce the output voltage 1591 within a desired range. As further shown, output voltage 1591 outputted from inductor 144-1 supplies current 1625 to power load 1518.

As previously discussed, switch circuitry 150-1, 160-1 can be any suitable type of switch resource (field effect transistors, bipolar junction transistors, etc.). In one embodiment, each of the high side switch circuitry 150-1 and low side switch circuitry 160-1 are power MOSFET (Metal Oxide Semiconductor Field Effect Transistor) or other suitable switch devices.

Appropriate switching of the high side switch circuitry 150-1 and the low side switch circuitry 160-1 results in generation of the output voltage 1591 as is known in a conventional DC-DC converter such as a buck converter.

Typically, the controller circuitry 1640 receives control output 1565 from phase control circuitry 1560 and, on this basis, controls the driver circuitry 115-1 to produce a PWM control signal 310 (PWM1) to control high side switch circuitry 150-1 and a PWM control signal (PWM1*) to control low-side switch circuitry 160-1. In general, the low side switch circuitry 160-1 is activated (closed or ON state) when the high side switch circuitry 150-1 is deactivated (open or OFF state), and vice versa.

As further discussed herein, with reference to both FIGS. 1 and 2, the phase control circuitry 1560 can be configured to compare the floor reference voltage 1515 and the output voltage feedback signal 192 in a manner as previously discussed to determine timing of activating high side switch circuitry 150-1 of the respective phase in the phase circuitry 1570 to an ON (closed switch) state. For example, the floor reference voltage 1515 serves as a threshold value. The phase control circuitry 1565 can be configured to compare the output voltage feedback signal 1592 to the floor reference voltage 1515.

In one embodiment, when the magnitude of the output voltage feedback signal 1592 crosses or falls below a magnitude of the floor reference voltage 1515 (or when the magnitude of the an output voltage feedback signal 1592 is substantially equal to the magnitude of the soft start signal 1595), the phase control circuitry 160 produces the control output 1565 to turn ON the high slide switch circuitry 150-1 (at which time the low side switch circuit 160-1 is turned OFF).

Note further that the power supply 1500 and corresponding phase 1570 can be operated in a so-called constant ON-time control mode in which the PWM (Pulse Width Modulation) setting of the ON-time of control pulses of switch circuitry (such as high side switch circuitry 150-1) in a phase is constant or fixed; the OFF time of high side switch circuitry 150-1 varies depending upon a subsequent cycle of comparing the output voltage feedback signal 1592 to the floor reference voltage 1515 and issuance of pulsing the high side switch circuitry 150-1 ON again via subsequently generated fixed pulse width (high side) switch control signals. If the decay of the magnitude of the output voltage 1591 reduces over time (because of lower current consumption), the frequency of pulsing the high side switch circuitry 150-1 ON again decreases.

Thus, in the constant ON-time control mode in which the ON-time of activating the high side switch circuitry is a fixed or predetermined value, the frequency of activating the high side switch varies to maintain the output voltage 1591 to a desired set point.

Figure 7:
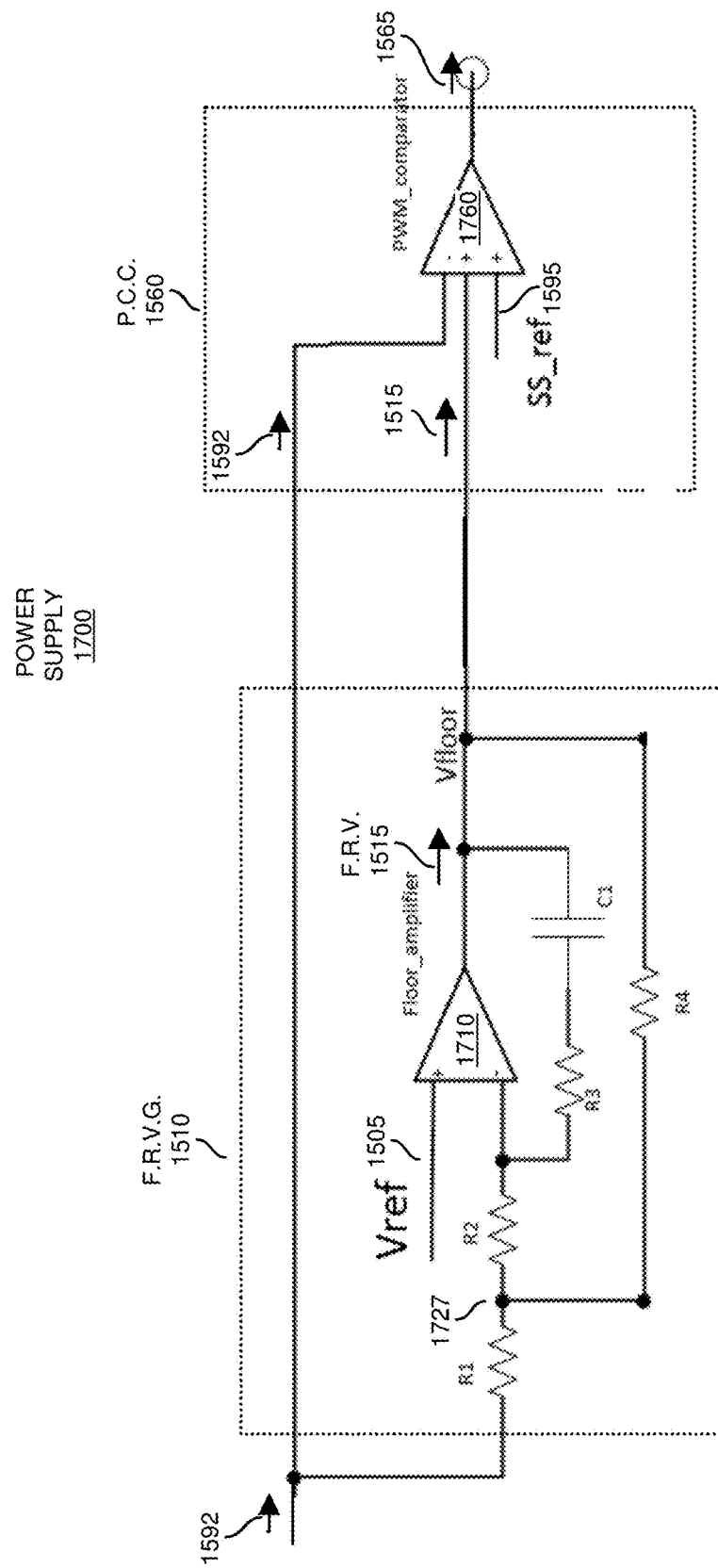
FIG. 7 is an example diagram illustrating a power supply and related circuitry according to embodiments herein.

FIG. 7 is an example diagram illustrating a power supply and related circuitry according to embodiments herein.

In this example embodiment, the reference voltage generator includes an integrator amplifier (circuit) including voltage mode amplifier 1710 to generate the floor reference voltage 1515 based on a magnitude of the output voltage 1591 and a fixed reference voltage 1505 (Vref).

For instance, the configuration of the reference voltage generator of FIG. 3 is identical thereto.

The reference voltage generator 1510 receives a fixed reference voltage signal Vref 1505 on a non-inverting input of the amplifier 1710. The reference voltage generator 1510 receives output voltage feedback signal 1592 over a circuit path (such as series combination of resistor R1 and R2) coupled to the inverting input of the amplifier 1710. Moreover, the reference voltage generator 1510 generates the floor reference voltage 1515 at an output of the amplifier 1710.

As previously discussed, the amplifier 1710 varies a magnitude of the floor reference voltage 1515 based on variations in the magnitude of the output voltage 1591 (and corresponding output voltage feedback signal 1592).

In accordance with further embodiments, the reference voltage generator 1510 (such as an integrator amplifier as previously discussed) is configured to include a combination pole and zero set by components (resistor R3 and capacitor C1) disposed in a feedback path (series connection of R3 and C1) between the output of the amplifier 1710 producing the floor reference voltage 1515 and the inverting input of the amplifier 1710.

As further shown in FIG. 7, the reference voltage generator 1510 can be configured to include a first (outer) gain path (such as combination of resistors R1 and R4) for DC signal gain and a second (inner) gain path (resistors R1 and R2, resistor R3 and capacitor C1) for AC signal gain.

In this example embodiment, the first gain path provides DC (Direct Current) gain of $-R4/R1$; the second gain path provides AC (Alternating Current) gain $-R3/[R1+R2]$. In one embodiment, the magnitude of the DC gain provided by the first gain path is substantially higher than a magnitude of the AC gain provided by the second gain path.

Use of voltage mode amplifier 1710 (in the floor reference voltage generator 1510) and selected settings of passive components R1, R2, R3, R4, and C1 (instead of a low—gain trans-conductance amplifier to generate the floor reference voltage 1515) ensure large DC gain and low high frequency gain to improve overall system accuracy of generating the output voltage 1591 at a desired setpoint or within a desired voltage range. Such a configuration of the reference voltage generator 1510 in FIG. 7 also avoids instability.

In one embodiment, the reference voltage generator 1510 is a PI (Proportional-Integrator) controller circuit including supplemental DC gain path (resistors R1 and R4).

In accordance with still further embodiments, the controller (phase control circuitry 1560) of the power supply 1700 can be configured to include a comparator 1760 operable to compare the output voltage feedback signal 1592 to the floor reference voltage 1515 (threshold value) to produce the control output 1565.

As previously discussed, the soft start reference 1595 can be used as an alternative to use of the floor reference voltage 1515 as a threshold value in certain operating conditions such as initial power up of the power supply 1500 when a magnitude of the soft start reference 1595 is less than a magnitude of the floor reference voltage 1515.

In one embodiment, the power converter 1570 operates in a so-called constant ON time mode in which the power converter 1570 utilizes the output control 1565 produced by the phase control circuitry 1560 (controller) to generate fixed pulse width switch control signals 310 (PWM1 and PWM1*) to produce the output voltage 1591 based on a comparison of the output voltage feedback signal 1592 to the floor reference voltage 1515.

More specifically, when the comparator 1760 detects a condition such as the magnitude of the output voltage feedback signal 1592 being equal to or falling below the floor reference voltage 1515, the comparator 1565 produces the control output 1565, which results in activation of the high side switch circuitry 150-1 to an ON state (closed switch).

Note further that although embodiments as discussed herein are applicable to multi-phase power supply circuits such as those implementing buck converters, DC-DC converter phases, the concepts disclosed herein may be advantageously applied to any other suitable topologies as well as general power supply control applications.

In one embodiment, the high DC gain of the reference voltage generator 1510 ensures high system accuracy. In accordance with yet further embodiments, there is no need for trimming circuit on the other components within a control loop of the power supply. The high gain of reference voltage generator 1510 can cure imperfections such as input referred offset of "OFF-Time Comparator", mismatch between Ton-charge current and Ramp charge current, etc.

In one embodiment, the AC gain provided by resistors R1, R2, and R3 prevents the floor amplifier 1710 from amplifying AC ripple on the output voltage feedback signal 1592. This ensures a clean switch period and avoids large jitter on the corresponding driving PWM signal.

Moreover, the power train inductor (such as inductor 144-1 of FIG. 6) and output capacitors 125 can introduce a double pole in the power supply 1500 at around 10 KHz. Via presence of the low frequency zero provided by the components R3 and C1 in the reference voltage generator 1510, a respective phase (such as power converter 1570) will be properly compensated to avoid system instability.

Note that as an optional circuit, in a manner as previously discussed, via mode control circuitry, depending on current operating conditions of the power supply 1500, the node 1727 can be driven with a voltage value such as Vpark, causing the output of the floor reference voltage 1515 to be set to predetermined fixed DC voltage, Vpark.

Figure 8:
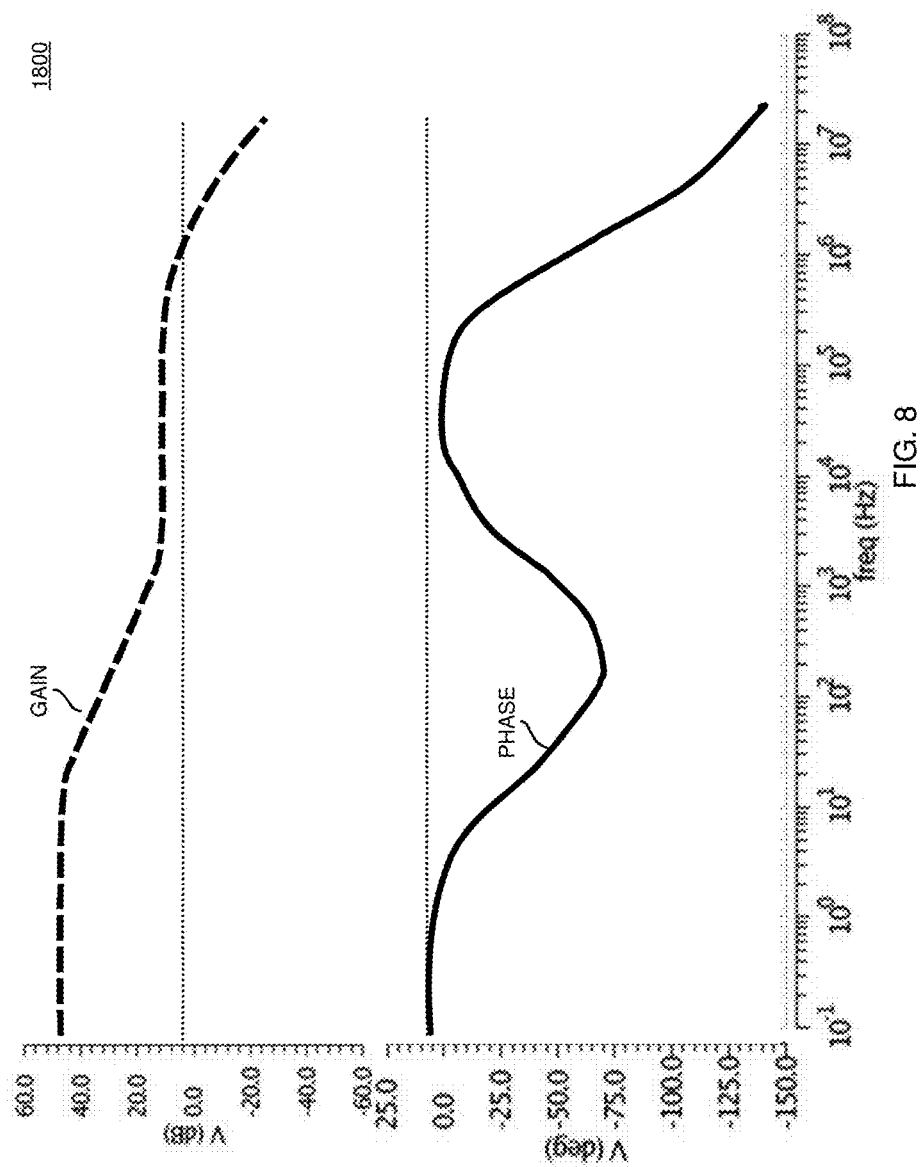
FIG. 8 is an example diagram illustrating a frequency response of a floor reference voltage generator according to embodiments herein.

FIG. 8 is an example diagram illustrating a frequency response associated with the reference voltage generator according to embodiments herein.

For illustrative purposes, in one non-limiting example embodiment, assume that the value of resistor R1=16 kilo-ohms; the value of resistor R2=1.2 mega-ohms; the value of resistor R3=1.2 mega-ohms; the value of resistor R4=1.2 mega-ohms; the value of capacitor C1=55 pico-farads. As mentioned, these values can vary depending on the embodiment.

Based on the above mentioned component settings, as shown in graph 1800, the overall system DC or lower frequency gain is high in reference voltage generator 1510; in this example, the DC gain is around 40 dB. As previously discussed, this DC gain is achieved though settings of resistors R1 and R4.

At a higher frequency such as centered around 50 Khz, C1 and R3 introduce a low frequency zero, which compensates (or reduces) the phase drop due to the low frequency pole. Presence of the low frequency zero also reduces the gain at high frequencies such as between 100 Hz and 100 KHz as shown in graph 1800.

Figure 9:
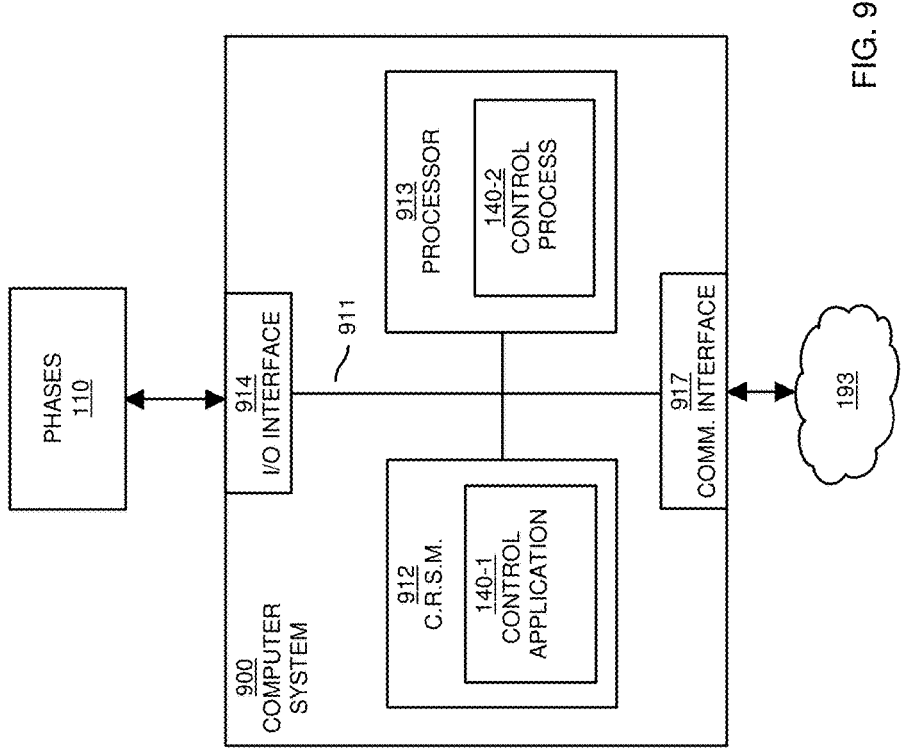
FIG. 9 is an example diagram illustrating computer processor hardware and related software instructions or logic circuit to execute methods according to embodiments herein.

FIG. 9 is an example block diagram of a computer device for implementing any of the operations as discussed herein according to embodiments herein.

As shown, computer system 900 (such as implemented by any of one or more resources such as floor voltage generator 1510, phase control circuitry 1560, phase circuitry 1570, logic, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914, and a communications interface 919.

I/O interface 914 provides connectivity to any suitable circuitry such as each of phases 110.

Computer readable storage medium 912 can be any hardware storage resource or device such as memory, optical storage, hard drive, floppy disk, etc. In one embodiment, the computer readable storage medium 912 stores instructions and/or data used by the control application 140-1 to perform any of the operations as described herein.

Further in this example embodiment, communications interface 918 enables the computer system 900 and processor 913 to communicate over a resource such as network 193 to retrieve information from remote sources and communicate with other computers.

As shown, computer readable storage media 912 is encoded with control application 140-1 (e.g., software, firmware, etc.) executed by processor 913. Control application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in control application 140-1 stored on computer readable storage medium 912.

Execution of the control application 140-1 produces processing functionality such as control process 140-2 in processor 913. In other words, the control process 140-2 associated with processor 913 represents one or more aspects of executing control application 140-1 within or upon the processor 913 in the computer system 900.

In accordance with different embodiments, note that computer system 900 can be a micro-controller device, logic, hardware processor, hybrid analog/dif circuitry, etc., configured to control a power supply and perform any of the operations as described herein.

Functionality supported by the different resources will now be discussed via flowchart in FIG. 10. Note that the steps in the flowcharts below can be executed in any suitable order.

Figure 10:
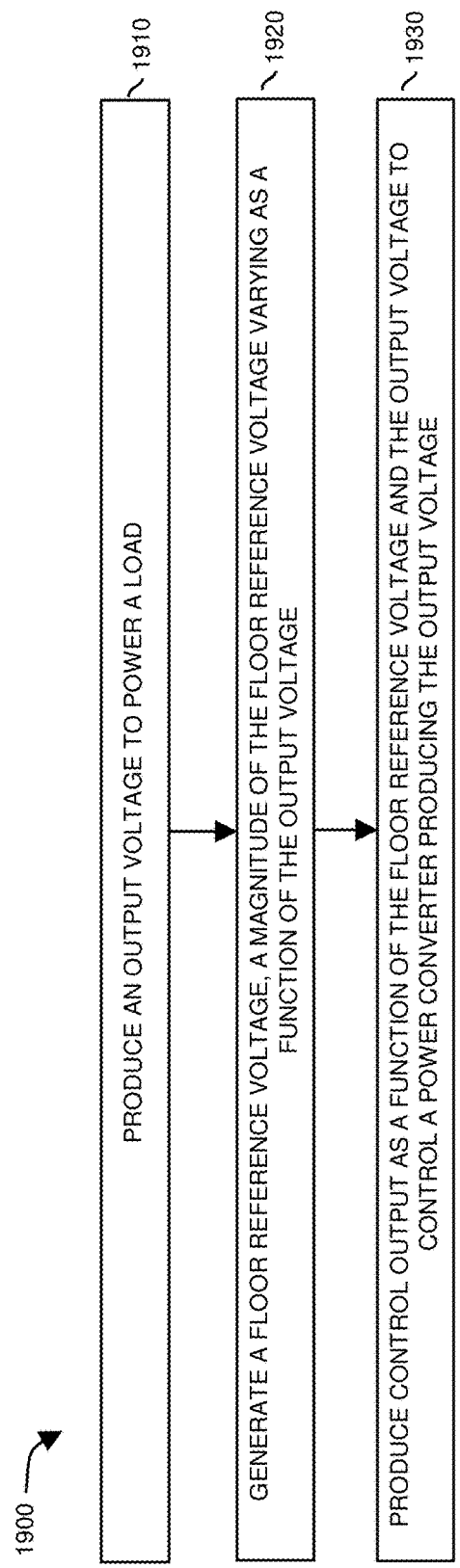
FIG. 10 is an example diagram illustrating a method according to embodiments herein.

FIG. 10 is an example diagram illustrating a method according to embodiments herein.

In processing operation 1910, the power converter 1570 produces an output voltage 1591 to power a load 1518.

In processing operation 1920, the reference voltage generator 1510 generates a floor reference voltage 1515. A magnitude of the floor reference voltage 1515 varies as a function of the output voltage 1515.

In processing operation 1930, the phase control circuitry 1560 (controller) produces control output 1565 as a function of the floor reference voltage 1515 and the output voltage 1591 to control the power converter 1570 producing the output voltage 1591.

Note again that techniques herein are well suited for use in power converter circuit applications such as those that include multiple phases, multiple DC-DC power converter circuits, semi-resonant DC-DC phases, buck converters, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A power supply comprising:
   a power converter to produce an output voltage to power a load;
   a reference voltage generator to generate a floor reference voltage, a magnitude of the floor reference voltage varying as a function of the output voltage;
   a controller to produce control output to control the power converter as a function of the floor reference voltage and the output voltage; and
   wherein the controller is operable to receive an output voltage feedback signal derived from the output voltage, the controller including a comparator to compare the output voltage feedback signal to the floor reference voltage to produce the control output.

2. The power supply as in claim 1, wherein the reference voltage generator includes PI controller circuitry.

3. The power supply as in claim 1, wherein the power converter is operable to generate fixed pulse width switch control signals to produce the output voltage based on the comparison of the output voltage feedback signal and the floor reference voltage.

4. The power supply as in claim 1, wherein a difference in magnitude between the output voltage feedback signal and the floor reference voltage indicates a degree to which a magnitude of the output voltage of the power supply is out of regulation.

5. The power supply as in claim 1 further comprising:
a mode controller operable to drive a feedback path of the reference voltage generator to operate the reference voltage generator in an override mode in which a magnitude of the floor reference voltage is fixed instead of varying.

6. The power supply as in claim 1, wherein the reference voltage generator includes an amplifier circuit to generate the floor reference voltage based on a magnitude of the output voltage and a fixed reference voltage.

7. The power supply as in claim 6, wherein the reference voltage generator is configured to include a combination pole and zero set by components disposed in a feedback path between an output of the amplifier circuit and an inverting input of the amplifier circuit.

8. The power supply as in claim 6, wherein the reference voltage generator includes a first gain path and a second gain path, the first gain path providing DC (Direct Current) gain, the second gain path providing AC (Alternating Current) gain.

9. The power supply as in claim 8, wherein a magnitude of the DC gain provided by the first gain path is substantially higher than a magnitude of the AC gain provided by the second gain path.

10. The power supply as in claim 1, wherein the reference voltage generator includes an integrator amplifier operable to: i) receive a fixed reference voltage signal on a non-inverting input of the integrator amplifier, and ii) receive an output voltage feedback signal driving a component path coupled to an inverting input of the integrator amplifier.

11. The power supply as in claim 10, wherein the integrator amplifier is operable to vary the magnitude of the floor reference voltage based on variations in a magnitude of the output voltage feedback signal.

12. The power supply as in claim 1, wherein the floor reference voltage is a threshold value; and
wherein the controller is operable to activate a high-side switch in a respective phase of the power supply in response to detecting that a magnitude of the output voltage feedback signal is equal to the threshold value.

13. The power supply as in claim 12, wherein the controller is operable to generate a fixed pulse width switch control signal as the control output, the controller generating the fixed pulse width switch control signal that controls a magnitude of the output voltage based on the comparison of the output voltage feedback signal and the floor reference voltage.

14. The power supply as in claim 1, wherein the floor reference voltage generator includes an amplifier, the power supply further comprising:
a mode controller operable to switch between generating the floor reference voltage as a fixed floor reference voltage and a varying floor reference voltage.

15. The power supply as in claim 14, wherein the mode controller controls a feedback path of the amplifier to switch between the fixed floor reference voltage and the varying floor reference voltage.

16. The power supply as in claim 1 further comprising:
a mode controller including an amplifier disposed in a feedback path of the reference voltage generator, the mode controller operable to control operation of the amplifier and switch between: a) operating in a first mode in which a magnitude of the reference voltage is fixed, and b) operating in a second mode in which the magnitude of the reference voltage varies.

17. The power supply as in claim 16 further comprising:
a switch disposed in the feedback path of the amplifier; and
wherein the amplifier is operated in a unity gain mode during the second mode, during which an output of the amplifier is disconnected from an input of the reference voltage generator.

18. The power supply as in claim 17, wherein the mode controller discontinues operating the amplifier in the unity gain and drives an input of the reference voltage generator with a voltage in the first mode during which a magnitude of the floor reference voltage is fixed.

* * * * *